United States Patent [19]

Inagami et al.

[11] 4,247,566
[45] Jan. 27, 1981

[54] METHOD OF PRODUCING DEODORIZED TEXTURED PROTEIN AND TEXTURED PROTEIN PRODUCED THEREBY

[75] Inventors: Kaoru Inagami, Tokyo; Takeshi Terabayashi, Hino; Kazutaka Ohmura, Kashiwa; Masao Haruna, Tokyo; Tetsuji Yuda, Yokohama, all of Japan

[73] Assignee: The Calpis Food Industry Co., Ltd., Tokyo, Japan

[21] Appl. No.: 51,059

[22] Filed: Jun. 22, 1979

[30] Foreign Application Priority Data

Dec. 26, 1978 [JP] Japan .................................. 53-159277

[51] Int. Cl.$^3$ ................................................. A23J 3/00
[52] U.S. Cl. .................................... 426/276; 426/656; 426/802
[58] Field of Search ................. 426/276, 656, 657, 802

[56] References Cited

U.S. PATENT DOCUMENTS

| 3,627,536 | 12/1971 | Arima et al. | 426/802 X |
| 3,674,500 | 7/1972 | Nagasawa et al. | 426/802 X |
| 3,794,731 | 2/1974 | Dannert et al. | 426/276 |
| 3,889,010 | 6/1975 | Brouwer | 426/276 |
| 3,987,213 | 10/1976 | Hawkins | 426/276 X |
| 4,018,903 | 4/1977 | Segeren et al. | 426/656 X |

Primary Examiner—Robert A. Yoncoskie
Attorney, Agent, or Firm—Browdy and Neimark

[57] ABSTRACT

A method of texturizing protein in granular or fibrous form comprises injecting the protein into a hydrostatic aqueous liquid under acid and heated conditions at a temperature of 110° C. and above, and permitting the protein to float up in the hydrostatic liquid while it becomes denatured.

13 Claims, No Drawings

METHOD OF PRODUCING DEODORIZED TEXTURED PROTEIN AND TEXTURED PROTEIN PRODUCED THEREBY

FIELD OF INVENTION

The present invention relates to a method of producing a textured protein in minute granular or fibrous form.

BACKGROUND OF INVENTION

Relating to texturizing protein, many methods have heretofore been known. For example, as a method of forming the fibrous structure and removing bad-smelling fragments, there is known a spinning process wherein an alkaline aqueous solution of protein is forced into a coagulation bath through an orifice.

Although this technique is superior in providing good fibrous texture and in deodorization, it requires several chemicals for the process and the process is complicated, and therefore it cannot be said to be an economical method. Relating to the above, as an economical method there has been known an extruding system, and relating to this method many improvements have been proposed. One of these is a method wherein a protein raw material containing about 15-40% of moisture is subjected to a pressing and heating treatment in an extruder, and then it is released through an orifice into the atmosphere thereby allowing it to expand and be texturized under water vapor pressure at the time of release thereof. This method has an advantage that its process is simple and produces the textured protein at a lower cost, however there is still a difficulty that most of bad-smelling fragments originating from the raw material are left as they are, and also there are many difficulties relating to the taste.

Moreover, recently there has been proposed a method of making a reticulated textured structure by use of water vapor. For example, Japanese patent application laying-open No. 15853/77 in such a method that an aqueous liquid coating protein is introduced into a restricted treating area and steam is injected therein, thereby reticulating and texturizing the protein, and Japanese patent application publication No. 6665/74 discloses a method wherein an aqueous liquid containing protein is forcibly caused to directly contact with steam through an ejector thereby causing denaturation by heating under the fluidized condition to produce the fibrous structure. However, neither method can be said to be preferable because in both methods steam is used in the open condition at a higher temperature, namely it is not preferable to release the pressure from a pressurized condition to the atmosphere in view of thermal efficiency considerations and also the operation thereof.

Moreover, in the method of Japanese patent application laying-open No. 88657/76, an aqueous liquid containing protein is subjected to a preheating treatment at a temperature above 30° C. and below a temperature which causes the gelatinization thereof, and then the thus treated material is extruded into a water bath of 90°-99° C. thereby completely causing the gelatinization and thus resulting in forming the fibrous structure. Japanese patent application publication No. 25535/75 discloses a method wherein an aqueous liquid containing protein is heated at a temperature above 74° C. in a tubular heat exchanger and then is released from the pressurized heated condition above 3.5 kg/cm$^2$ (50 psig) into the air or water under the atmospheric pressure. Even if the above two methods are used, the removal of the bad-smelling fragments originating from the raw material is insufficient, and therefore there is still a large difficulty in this respect.

SUMMARY OF INVENTION

An object of the present invention is to provide a food stuff which has a granular or fibrous structure without bad-smelling fragments originating from the raw material; another object is to produce such a structure in an economical manner. It has been found that when an aqueous liquid containing protein is gently injected into a hydrostatic aqueous liquid of a temperature above about 110° C., the saccharide and bad-smelling fragment are gradually separated off, by dissolution etc., from the aqueous liquid containing protein into the hydrostatic aqueous liquid, and on the other hand the protein is gradually aggregated, and with further progress of the denaturation by heating, the aggregated protein becomes granular or fibrous, thus resulting in forming the textured protein completely free of the bad-smelling fragment originating from the raw material. It is important that the protein progressively floats up in the hydrostatic aqueous liquid at a temperature of 110° C. or above and at the same time the transfer of the saccharide etc. into the aqueous liquid progresses in parallel with aggregation of protein due to the denaturation by heating.

When the whole aqueous liquid containing protein itself is heated by a batchwise treatment in an autoclave, the bad-smelling fragments are enclosed in the gel of protein, and even if it is subjected to a pressurized heating treatment after a preheating, if using a conventional heating method, the bad-smelling fragments are still difficult to separate from the gel of protein. Also, even if the aqueous liquid containing protein is caused to instantaneously contact with water vapor of a higher temperature, the denaturation of the protein progresses rapidly, so that the bad-smelling fragments are also enclosed in the gel of protein, so that the deodorization is insufficient. Only by the present greatly limited method is it possible to separate the protein component from impurities such as bad-smelling fragments etc.

DETAILED DESCRIPTION OF INVENTION

Hereinafter, this method and phenomenon will be concretely explained in accordance with an experimental example using an apparatus having a transparent glass window. An aqueous liquid containing protein of pH 5.0 containing 10 W/W% of defatted soybean powder having protein content of 55 W/W% was gently injected into a hydrostatic aqueous liquid of 130° C. through an orifice while the behavior of the aqueous liquid containing protein was observed. It seemed that the mass of the injected aqueous liquid containing protein rose up gently through the hydrostatic aqueous liquid and the periphery of the mass gradually became whitely turbid, thereby it seemed as if the mass enlarged, but at this time the carbohydrate etc. were diffused and separated away and simultaneously the insoluble aggregate became visible and this aggregate was subjected to further progressing denaturation by heating as it rose up in the liquid thereby resulting in forming the granular or fibrous structure.

Thus obtained granular or fibrous product was taken out and analyzed, and as a result its protein content was 90 W/W%, and the protein yield relative to the raw material was 88% and above. Using this apparatus, the same aqueous liquid containing protein was injected into water vapor of 130° C. instead of the hydrostatic aqueous liquid and as a result the denaturation by heating was recognized, but its effect of deodorization was small. Also in the case of the injection into the hydrostatic aqueous liquid of a temperature of 110° C. and below, the denaturation by heating and the aggregation of protein were delayed, so that a part of the protein was dispersed into the hydrostatic aqueous liquid, with the result that the yield of product was reduced.

The present invention comprises the following steps: injecting liquid containing vegetable protein having a protein content of 0.4–30 W/W% through an orifice into a hydrostatic aqueous liquid and the protein is caused to be denatured under the condition of pH 4.0–6.5 and at a temperature of 110°–200° C. while allowing the protein to float up in the hydrostatic aqueous liquid, thereby continuously texturizing the protein into granular or fibrous structure, and then the product of textured protein is taken out. The obtained product was a granular or fibrous one which was completely free of the bad-smelling component peculiar to the raw material.

When injecting the aqueous liquid containing protein into the hydrostatic aqueous liquid of a higher temperature of 110° C. and above and causing the injected matter to gently float up, such substances as oligosaccharide, starch, bitter component, bad-smelling fragments etc. become dispersed, by dissolving etc., into the hot water comparatively rapidly, and the substance mainly composed of protein gradually becomes insoluble thereby forming granular or fibrous bodies, and these bodies rise. The difference between the invention disclosed in Japanese patent application No. 74838/78 and the present invention lies in that, in the former, before the completion of the denaturation by heating the protein is accumulated in the interface and the denaturation by heating is completed in the interface like in the case of "Yuba" (filmy curds of soybean protein) to obtain the product, and on the contrary, in the latter, without using the interface the denaturation is effected during the floating-up in the hydrostatic aqueous liquid thereby obtaining minute granular or fibrous product.

Hereinafter the present invention will be explained in detail.

The vegetable protein, referred to in the present invention, means one that is obtained from the seed of the soybean, peanut, wheat and cotton, etc. It is also possible to use mixtures of one or more kinds of different vegetable proteins. Also, it is possible to add animal proteins such as milk casein, egg white etc. and protein of microorganisms appropriately to such a degree that does not interfere with the present invention, and according to the use thereof it may be sometimes preferable to add such a protein. Also, in order to prevent the protein injected into the hot hydrostatic aqueous liquid from dispersing into the hydrostatic aqueous liquid, the aqueous liquid containing the vegetable protein has added thereto a thickener, fat or surfactant appropriately, thereby improving the yield of protein of the product. As thickener used for this purpose, there are guar gum, xanthan gum, gum arabic, agar, carrageenan, etc., and a substance having a thickening effect will be effective. Its amount of addition is sufficiently 5 W/W% and below with respect to the aqueous liquid containing protein.

The protein content in the aqueous liquid containing protein is 0.4–30 W/W%. If it is below 0.4 W/W%, the yield of product becomes poor, and if it is above 30 W/W% the fluidity of the aqueous liquid containing protein becomes poor, resulting in difficulty of injecting operation of the liquid. Also, the protein content per total solid matter in the aqueous liquid containing protein is 40 W/W% (protein/solid matter) and above. In the case of the protein content is below 40 W/W% the yield of product is bad. The solid matter content in the aqueous liquid containing protein is 1–35 W/W%, and more preferably 5–25 W/W%. In the case that the solid matter content is less than 1 W/W%, the yield of product becomes bad, and when it is above 35 W/W%, the fluidity of the aqueous liquid containing protein becomes poor and the injecting operation becomes difficult.

The acid condition, referred to in the present invention, is a range of pH 4.0–6.5, preferably pH 4.5–5.5. In the case of a pH below 4.0 or above 6.5, even if it is heated to a temperature of 110° C. and above, the desired texturization does not occur. The pH adjustment is carried out by adjusting the pH of the aqueous liquid containing protein to be injected before such injection or by adjusting the pH of the hydrostatic aqueous liquid in the apparatus, or by the combination of the both. However, in the viewpoint of easy operation and rapid progress of the denaturation by heating of protein, it is desirable to adjust the pH of the aqueous liquid containing protein to be injected to the desired value. For the pH adjustment, acid and alkali can be used, and for example, hydrochloric acid, phosphoric acid, citric acid, sodium hydroxide, sodium bicarbonate etc. may be used.

Also, in order to obtain the textured protein with good yield, the following operations may be effective. Namely, in the aqueous liquid containing protein, it is preferred to treat in such a manner that the protein and the impurities such as carbohydrate etc. are maintained in the separated state from each other as much as possible, or that the protein is made hydrophobic. As this treatment method, it is possible to easily attain the object by such processes that the aqueous liquid cntaining protein is previously subjected to a heating treatment at a temperature of 110° C. and below, that it is retained under a stronger alkaline condition and thereafter adjusted to a pH near the isoelectric point by the use of acid, or that the aqueous liquid containing protein is maintained under a stronger acid condition and thereafter adjusted to a pH near the isoelectric point by the use of alkali, and so on. In addition, as described above, if a thickener is added to the aqueous liquid containing protein, the protein is prevented from dispersing into the hydrostatic aqueous liquid in the non-denatured state. It is also effective to adjust the pH of the liquid close to the isoelectric point, to add salts which is able to prevent the dissolution of protein, and so on.

The aqueous liquid containing protein is injected into the heated hydrostatic aqueous liquid through an orifice, thereby producing aggregates due to the denaturation by heat.

In order to inject the aqueous liquid containing protein into the hydrostatic aqueous liquid, it is required to exert enough pressure to carry out the injecting of the protein liquid into the pressurized hydrostatic aqueous liquid. In general, a pressure pump can be used. The injection speed, and shape (circle, ring, rectangle etc.) and size of the orifice varies in accordance with various conditions, such as size of apparatus, performance of the injection pump, physical properties (such as viscosity etc.) of the aqueous liquid containing protein etc., and what is important is, as described below, to provide a condition in which the injecting substance injected into the hydrostatic aqueous liquid remains in the form of mass at first and gently floats up through the liquid as it is in the state of mass, and it is necessary, in the present invention, not to provide such a condition that the mass of the injecting substance is allowed to be disturbed immediately after the injection thereof, so that the whole mass becomes dispersed in the hydrostatic aqueous liquid.

In order to inject the aqueous liquid containing protein into the hydrostatic aqueous liquid and cause it to be denatured by heat, thereby obtaining the textured protein, it is necessary that it is subjected to the denaturation by heat under acidic condition at a temperature of 110° C. and above. The heating to 110° C. and above is carried out under pressurized condition, and as to the method, there may be used any one of a direct heating method, a method in which heated water vapor is injected into the hydrostatic aqueous liquid, and an indirect heating method by use of a heat transfer agent. If the temperature drops below 110° C. the yield of protein of the product reduces. The upper limit of temperature is not particularly restricted, but the temperature of 200° C. and below is preferable in consideration of energy loss, browning of the product and so on. With respect to the condition of temperature distribution in the whole hydrostatic aqueous liquid, the present invention has no specified condition. What is essential is that there is only required a sufficient temperature portion (temperature area) to cause the injected protein to float up while allowing it to form granular or fibrous textured product.

In the present invention, as described above, it is preferable that when the mass of the aqueous liquid containing protein injected into the heated hydrostatic aqueous liquid is floating-up, the hydrostatic aqueous liquid is hydrostatic to such an extent that the formation of the aggregate due to the denaturation by heat of protein is not obstructed. For this purpose, it is required to consider the atmosphere of the hydrostatic aqueous liquid where the orifice is located, and the condition of injecting of the aqueous liquid containing protein etc. Namely, it is preferable that the hydrostatic aqueous liquid of 110° C. and above is kept quiet as much as possible, and the injecting speed and amount of the aqueous liquid containing protein injected through the orifice are of such an extent that the mass of the aqueous liquid containing protein is not greatly disturbed. Moreover, it is also required to consider the property of the injecting aqueous liquid containing protein, the property of the hydrostatic aqueous liquid existing at a location where it is subjected to the denaturation by heat, and the heating method etc. As an embodiment, for example, such a method is used that a cylindrical guard or baffle is mounted at a location where the injected aqueous liquid containing protein floats up so as to cause it to float up within the guard, thereby preventing the disturbance of the liquid.

Since the mass of the aqueous liquid containing protein of the present invention has a floating-up property in the hydrostatic aqueous liquid, it naturally rises up in the hydrostatic aqueous liquid. However, there is such a case that when it gets to a location where the hydraulic pressure of the liquid lowers with dropping of the temperature thereof, the buoyancy thereof sometimes becomes weak, but in such a case, it is possible to aid the floating-up thereof by forming an airlift by blowing a gas such as compressed air or heated water vapor etc. into the hydrostatic aqueous liquid. The aqueous liquid containing protein should be subjected to the denaturation by heat while floating-up through the hydrostatic aqueous liquid and a required degree of the denaturation of heat may vary in accordance with a required property of the structure of product. When a hard product having strong hydrophobic property is required, use is made of a high-temperature treatment, or a longer heat-treatment time etc., and when a product having the structure of a light mouthfeel is required, use may be made of a treatment at a lower temperature near 110° C. or a treatment with a shorter heat-treatment time. Accordingly, a floating-up distance which is required to allow the protein to be sufficiently subjected to the denaturation by heat during the floating-up through the hydrostatic aqueous liquid is related to the heating time, and it is selected according to the desired property of the product to be produced, and as well according to the composition of the aqueous liquid containing protein, treating temperature, separation capacity of undesired components other than protein and so on. For effecting the denaturation by heat necessary for obtaining the object of the present invention, a floating-up distance of 15–150 cm of hot hydrostatic liquid is required.

As apparatus used in the present invention, there are mainly two types, namely one which has a device for taking out the product from an upper free opening (under atmospheric pressure), and the other which has a device for taking out the product from a high pressure zone to an atmospheric pressure zone.

The former is of a so-called hydrostatic pressure type and it is such an apparatus wherein there is provided a free opening at atmospheric pressure at the upper portion of the hydrostatic aqueous liquid, and namely by utilizing a hydraulic pressure, a temperature of 110° C. and above is maintained at the lower portion where the aqueous liquid containing protein is pressed in and the temperature progressively becomes lower towards the upper portion, and at the free opening at the upper portion a temperature of 100° C. and below can be obtained. Accordingly, the product can easily be taken out through the free opening. For this purpose, in consideration of efficiently carrying out the invention, it is sufficient for the pressure to use a hydraulic pressure of the hydrostatic aqueous liquid of 7 meters and above in height. Even if in case of hydraulic pressure below 7 meters, if there is a hydraulic pressure about 5 meters, it is possible to produce the heating temperature referred to in the present invention. Also, it is possible to adjust the temperature of the free opening portion by cooling the intermediate or upper portion of the hydrostatic aqueous liquid.

On the other hand, the latter type may use a known device, such as rotary valve etc., for taking out the product from a high pressure zone to an atmospheric pressure zone. Of course, this taking-out device is mounted at a higher point than the height of the hydrostatic aqueous liquid necessary for the completion of the denaturation by heating of the protein. If the main apparatus having the hydrostatic aqueous liquid contained therein is of a closed type, with regard to the height of the hydrostatic aqueous liquid related to the hydraulic pressure referred to in the former apparatus, it is not required any specific condition therefor. What is required is basically to have a height along which the protein floats up for effecting the denaturation by heat. Accordingly if the apparatus is of a closed type, as a matter of course, the height of the hydrostatic aqueous liquid may be 5 meters or less.

Also, for the heating under pressure, in the present invention, use can be made of such a method that a hydraulic pressure as explained in the former case is utilized and the upper portion of the hydrostatic aqueous liquid has a free opening, and the taking-out of the product is not performed through said free opening, but by means of such a device that is located midway the height of the hydrostatic aqueous liquid (under pressurized condition) and applied to take out the product from a high pressure zone to an atmospheric pressure zone, such as rotary valve.

In the present invention, there is also seen an interface at the upper portion of the hydrostatic aqueous liquid or at a location of the taking-out device for the product, however these interfaces are such ones, namely, at these interfaces, the product produced by the completion of the denaturation by heat of protein contacts these interfaces only at the time of the taking-out thereof, and therefore it is clearly different from the interfaces used as a place where the denaturation by heat is caused for forming the accumulated structure as is previously described in relation to Japanese patent application No. 74838/78.

According to the method of the present invention, since the product is of small size and progressively floats up, the taking out operation of the product is easier than that in the interface method above described. Namely, the present invention is suitable for a continuous production method.

As is understood from the above, an apparatus for carrying out the present invention may be of a very simple one. For example, a pipe mounted vertically is used, which has an inlet for water and an outlet for water and has an inside diameter of 15 cm and a length of 15 m, so that a hydrostatic aqueous liquid having a hydraulic pressure of about 15 m high can be provided, and a vapor jacket for heating of about 1.5 m long is mounted at the lower portion of the pipe, and a thin pipe with an orifice having a diameter of 0.1 cm is inserted into the pipe at a location about 30 cm from the lower end thereof, through which thin pipe said aqueous liquid containing protein is injected. Besides, there may be provided, according to requirements, a means for removing the suspended matter composed of impurities and the precipitation residue, a guard provision for protecting the floating-up of the aqueous liquid containing protein, an air forcing-in device for assisting the floating-up of the product, a cooling device for the upper portion of the pipe, and a collecting device for the product ect., and these provisions are simple ones.

Relating to the size of the product obtained according to the present invention, when the disturbance of the mass of the injected substance is made as little as possible, for example by such a way that the injection is carried out gently, a fibrous product can be obtained, and when the disturbance is caused more or less, a granular product can be obtained. Usually, in the case of the granular product, its diameter is 0.5 cm and below, and in the case of the fibrous product, its diameter is 0.1 cm and below.

It is also possible to make the structure soft or heighten the affinity to water by treating the textured protein obtained in the present invention by use of aqueous solution of sodium carbonate, aqueous ammonia solution or ammonia gas according to the object of use, so that various plans can be appropriately elaborated.

The textured protein obtained according to the present invention can be used for products of hamburger, "Soboro" (cooked meat powder), "Furikake" (dried meat powder for sprinkling on cooked rice or other cooked foods) and shao-mai (ravioli like) etc. Since such a one produced by the interface method, as explained previously, has an accumulated structure having substantial thickness and lateral spread, it can be adapted to produce foods of larger construction, but the product according to the present invention is suitable for producing foods of minute composition. The product produced according to the present invention has no bad-smell originating from the raw material and at the same time has a higher protein content (purity). As described above, there is not seen in the prior art method such a phenomenon that the defatted soybean product of the purity of 55 W/W% of protein content can be improved to the purity of 90 W/W% by the present invention, namely by only one process.

PRACTICAL EXAMPLE 1

A slightly-denatured defatted soybean was obtained by defatting the raw soybean on the market by use of n-hexane according to the normal method.

1 part by weight of this defatted soybean powder was added with 9 parts by weight of water, and by conventional technique, insoluble matter was removed, thereby obtaining an aqueous liquid containing protein of 6.5 W/W% of solid matter and 62 W/W% of protein/solid matter, and to this aqueous liquid containing protein was added 1 N solution of hydrochloric acid to adjust pH of the liquid to 5.2.

Next, the following apparatus was provided. A pipe of stainless steel having a diameter of 15 cm and a length of 20 m was vertically mounted, and water was filled in the pipe. The lower portion of thus formed hydrostatic aqueous liquid was heated by a heated vapor so that the temperature was maintained at $127 \pm 3°$ C. A thin pipe having an injection orifice of an inside diameter of 1.0 mm is inserted 30 cm into the pipe from the lower face thereof and fixed in place. Around this thin pipe, an inner cylinder of 10 cm in inside diameter and 1.5 m high was mounted, which cylinder was formed by a perforated sheet having a number of holes. The inside cylinder was adapted to prevent the disturbance of the hydrostatic aqueous liquid caused at the time of heating of the aqueous liquid and served as a guard cylinder during the floating-up of the aqueous liquid containing protein.

Said aqueous liquid containing protein was injected into the apparatus under pressure through said orifice at a flow rate of 150 ml/min. without any fluctuation of pressure by means of a continuous slurry pummp. Thus injected aqueous liquid containing protein floated up inside the guard cylinder in the hydrostatic aqueous liquid while non-protein substances such as carbohydrate etc. became white-muddy matter and was dispersed around, while the protein was subjected to the denaturation by heat and became the fibrous aggregate and further continued floating-up. This phenomenon was observed through a peep window mounted so as to be able to observe the floating-up portion. When air was blown in the form of bubbles from a point 6 m high above the lower face of the hydrostatic aqueous liquid, the product was further raised and floated up to the upper free portion of the pipe.

The product was composed of granular and fibrous substances having a longest size of about 1 to 5 mm. The purity, namely a ratio of protein/solid matter was 92 W/W% and had no bad-smell of soybean. Also, the yield per protein was about 90%.

PRACTICAL EXAMPLE 2

Defatted soybean powder on the market (The Nisshin Oil Mills Co., Ltd. SOL-P NY: protein content 60.0 W/W%) was put in a dilute solution of hydrochloric acid thereby preparing an aqueous liquid containing protein of pH 5.5 and 1.5 W/W% of protein content. An apparatus of closed type was used, which was similar to that used in Practical Example 1 except that it has a length of the stainless steel pipe shorter than 20 m and a rotary valve at a height of 4 m from the bottom thereof, and said aqueous liquid containing protein was injected into the heated hydrostatic aqueous liquid in the apparatus under pressure. The product was nearly the same as that of Practical Example 1. The method of Practical Example 2 is such a one that does not require a high tower compared with that of Practical Example 1.

APPLICATION EXAMPLE OF THE PRODUCT

The textured protein obtained in Practical Example 1 was colored like meat by means of caramel and monascus color. The resulting product which was further mixed with table salt, seasoning, and spice and was effective as substitute for meat hamburger. In the case of the prior art soybean textured protein on the market (made by the extruder method), if it was added to the meat hamburger in an amount of 15% thereof, soybean flavor was detected, but in the case of the product above described, even if it was added in an amount of 50%, no soybean flavor was felt.

What is claimed is:

1. Method of producing continuously granular or fibrous textured protein which comprises: injecting an aqueous liquid containing a vegetable protein content of 0.4–30 W/W% through an orifice, which is provided at the lower portion in a hydrostatic aqueous liquid, into the hydrostatic aqueous liquid and the protein being caused to be denatured, while the protein floats up in the hydrostatic aqueous liquid, under the condition of pH 4.0–6.5 and at a temperature of 110°–200° C., thereby texturizing the protein into granular or fibrous structure.

2. Method as claimed in claim 1, wherein use is made of a hydrostatic aqueous liquid under a hydraulic pressure of at least 7 meters.

3. Product produced by a method as claimed in claim 1.

4. Product produced by a method as claimed in claim 2.

5. A method of continuously producing granular or fibrous textured vegetable protein comprising:
providing a hydrostatic aqueous liquid capable of absorbing unsatisfactory components from the vegetable protein and having a hot zone at a temperature of 110°–200° C. of height between 15 and 150 cm;
providing aqueous liquid slurry containing said vegetable protein in an amount of 0.4–30 W/W%, the protein content of solids in said slurry being at least 40 W/W%, and the total solids in said slurry being in the range of 1–35 W/W%;
gently injecting said aqueous liquid slurry through an orifice into said hydrostatic aqueous liquid at a location at the bottom of said heated zone of height 15–150 cm, and under conditions such as to prevent substantial disturbance of the injected slurry in said hot zone, and wherein the pH is maintained at 4.0–6.5; and
texturizing the protein into granular or fibrous structure while it floats upwardly through said hot zone of said hydrostatic aqueous liquid while denaturation occurs.

6. A method as claimed in claim 5, wherein the pH is maintained at 4.5–5.5.

7. A method of claimed in claim 5, wherein said aqueous slurry of vegetable protein further contains a thickener.

8. A method as claimed in claim 7, wherein said thickener is selected from the group consisting of guar gum, xanthan gum, gum arabic, agar, and carrageenan.

9. A method as claimed in claim 5, wherein said pH is maintained by adding acid to said slurry of vegetable protein before it is injected into said hydrostatic aqueous liquid.

10. A method as claimed in claim 5, wherein said aqueous slurry containing vegetable protein is preheated to a temperature approaching 110° C. prior to said injection into said hydrostatic aqueous liquid.

11. A method as claimed in claim 5, wherein said gentle injection of said aqueous slurry of vegetable protein into said hydrostatic aqueous liquid takes place within a guard or baffle mounted within said hydrostatic aqueous liquid, in order to help with said prevention of disturbance.

12. A method as claimed in claim 5, wherein the upper surface of said hydrostatic aqueous liquid is under superatmospheric pressure.

13. A method as claimed in claim 5, wherein the textured protein is removed from said hydrostatic aqueous liquid at a location beneath the upper surface thereof.

* * * * *